United States Patent
Huang-Fu et al.

(10) Patent No.: US 9,462,618 B2
(45) Date of Patent: Oct. 4, 2016

(54) METHOD OF CALL SETUP TIME REDUCTION FOR VOICE OVER LTE

(71) Applicant: MEDIATEK INC., Hsinchu (TW)

(72) Inventors: Chien-Chun Huang-Fu, Hsinchu (TW); Yu-Syuan Jheng, Taipei (TW); Wei-Chiang Peng, Taoyuan (TW); Chia-Hung Tsai, Hsinchu (TW); Yih-Shen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 210 days.

(21) Appl. No.: 14/198,892

(22) Filed: Mar. 6, 2014

(65) Prior Publication Data

US 2015/0257178 A1    Sep. 10, 2015

(51) Int. Cl.
*H04W 76/02* (2009.01)
*H04L 29/06* (2006.01)

(52) U.S. Cl.
CPC .......... *H04W 76/021* (2013.01); *H04L 65/103* (2013.01); *H04L 65/104* (2013.01); *H04L 65/1006* (2013.01); *H04L 65/1069* (2013.01); *H04L 65/1096* (2013.01); *H04L 65/80* (2013.01); *H04W 76/027* (2013.01)

(58) Field of Classification Search
CPC ...... H04W 76/02; H04W 72/04; H04L 65/00
USPC .......................................... 455/450; 370/352
See application file for complete search history.

(56) References Cited

U.S. PATENT DOCUMENTS

| | | | | |
|---|---|---|---|---|
| 2002/0165966 A1* | 11/2002 | Widegren | ............... | H04L 12/14 709/226 |
| 2005/0157660 A1* | 7/2005 | Mandato | ............. | H04L 12/5695 370/254 |
| 2005/0160152 A1* | 7/2005 | Selin | ................. | H04L 29/06027 709/217 |

(Continued)

FOREIGN PATENT DOCUMENTS

| CN | 101448221 A | 6/2009 |
|---|---|---|
| CN | 101552952 A | 10/2009 |

(Continued)

OTHER PUBLICATIONS

SDP: Session Description Protocol, RFC 2327, Handley et al. Apr. 1998.*
SIP: Session Initiation Protocol, RFC 3261, Rosenberg et al. Jun. 2002.*
International Search Report and Written Opinion of International Search Authority for PCT/CN2014/077353 dated Dec. 12, 2014 (13 pages).

*Primary Examiner* — William Nealon
(74) *Attorney, Agent, or Firm* — Imperium Patent Works; Zheng Jin

(57) ABSTRACT

Methods and apparatus are provided for a voice over LTE system to shorten the call set up time. In one novel aspect, the mobile origination (MO) UE starts the UE-initiated dedicated resource allocation before receiving any responses from the remote UE. In another embodiment, the mobile termination (MT) UE starts the UE-initiated dedicated resource allocation upon receiving the INVITE from the remote UE. In one embodiment, the UE adjusts the timeout value based on the PLMN information in its PLMN database. The timeout value can be set to be zero if early reservation is allowed. Upon timer expires, the UE starts UE-initiated dedicated resource allocation. In one novel aspect, the MO UE retrieves the codec information of a remote UE from its peer profile information database and uses a matching codec in its INVITE message. In another embodiment, the MT MO includes the SDP answer in its 180 RINGING message.

23 Claims, 9 Drawing Sheets

UE DIAGRAM SUPPORTING EARLY-NEGOTIATION AND EARLY-RESERVATION

(56) References Cited

U.S. PATENT DOCUMENTS

2006/0233333 A1* 10/2006 Brombal ............ H04L 65/1006
 379/114.2
2008/0248762 A1* 10/2008 Lee .................... H04L 65/4061
 455/90.2
2010/0128722 A1 5/2010 Madour et al. ............... 370/352

FOREIGN PATENT DOCUMENTS

| CN | 101835121 A | 9/2010 |
| CN | 101448221 B | 5/2011 |
| CN | 102227926 A | 10/2011 |
| CN | 101552952 B | 12/2011 |

* cited by examiner

SYSTEM DIAGRAM SUPPORTING EARLY-
NEGOTIATION AND EARLY-RESERVATION

UE DIAGRAM SUPPORTING EARLY-NEGOTIATION AND EARLY-RESERVATION

EARLY-RESERVATION WITH PRECONDICTION CALL SET UP MODEL

EARLY-RESERVATION WITH BASIC CALL MODEL

EARLY-NEGOTIATION

METHOD OF CALL SETUP TIME REDUCTION FOR VOICE OVER LTE

TECHNICAL FIELD

The disclosed embodiments relate generally to voice over Long Term Evolution (LTE) network, and, more particularly, call setup time reduction for voice over LTE.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, e.g., evolved Node-Bs (eNBs) communicating with a plurality of mobile stations referred as user equipments (UEs).

The LTE system, however, is optimized for data transfer. It is designed as a packet switch all-IP system without any circuit switched domain currently used for regular voice services. Even with the rapid growth of the data communication over the network, the wireless voice business is still the main source of revenue for operators. For operators evolving to LTE, providing voice on one network and data on another does not make financial sense. Voice will become an integral part of LTE. Voice over LTE provides such services for the operators to offer telecom grade voice, video calling and other new richer communication services on LTE Smartphones.

One of the challenges to provide telecom grade voice and video call over LTE is to shorten the call set-up time. In voice over LTE, when a voice or a video call is initiated, the UE needs to negotiate codec and reserve bearer for the communication. This is required for both mobile originated (MO) and mobile-terminated (MT) calls. The codec negotiation may take several rounds. For example, Session Description Protocol (SDP) is one common way for codec negotiation in voice over LTE. The caller will first send its codec information to the callee through a first SDP offer message. The callee, upon receiving the first SDP offer message, may not be able to find a match and would reject the first SDP offer. The caller will then need to proceed with a second SDP offer. The SDP negotiation has to be complete before the call can be successfully set up. Improvements are needed to shorten the SDP negotiation time.

Second, initial resource allocation also delays call set-up for voice LTE. In the current system design, resource allocation is initiated by the network. UE is refrained from requesting additional evolved packet system (EPS) bearer context for media unless the UE detects that the network does not initiate resource allocation for the media. The UE detects the failure of the network allocation relying on a timer. The SDP negotiation and initial resource allocation delay the call set-up for voice over LTE. Improvements are needed to shorten the call set up time.

SUMMARY

Methods and apparatus are provided for a voice over LTE system to shorten the call set up time. In one novel aspect, the early resource allocation is used. In one embodiment of the current invention, the MO UE starts the UE-initiated dedicated resource allocation procedure before receiving any responses from the remote UE. In another embodiment of the current invention, the MT UE starts the UE-initiated dedicated resource allocation procedure upon receiving the INVITE from the remote UE. In one embodiment of the current invention, the UE maintains a PLMN profile database. In one embodiment, the MO UE retrieves PLMN profile information. The MO UE set a timeout value based on the retrieved PLMN information upon or before initiating the call. In one embodiment, the timeout value is decreased if the network preference in the PLMN information indicates early resource reservation allowed. In another embodiment, the timeout value is set to be zero. The MO UE starts the timer using the timeout value upon receiving any 1xx provisional response messages. When the timer expires, the MO UE starts the UE-initiated dedicated resource allocation procedure. In one other embodiment, the MT UE retrieves PLMN information and set the timeout value based on the PLMN information. The timeout value is decreased or set to zero if the network preference in the PLMN information indicates early resource reservation allowed. The MT UE upon sending the first 1xx provisional response message starts the timer using the timeout value. The MT UE starts the UE-initiated dedicated resource allocation procedure upon the timer expires.

In another novel aspect, early SDP negotiation is used to shorten the call set up time. In one embodiment of the current invention, the UE has a peer profile database. In one embodiment, the MO UE retrieves the codec information of the remote UE before initiating the call. The MO UE chooses a matching codec to include in the initial INVITE message sending to the remote UE. The UE upon receiving SDP information from a remote UE, updates its peer profile database. In another embodiment, the MT UE includes the SDP answer with its codec information in the 180 (RINGING) message.

DETAILED DESCRIPTION

Reference will now be made in detail to some embodiments of the invention, examples of which are illustrated in the accompanying drawings.

Voice over LTE empowers service providers to offer rich voice, video and other real time services in a cost effective way. The service providers can leverage the benefits of LTE networks to monetize voice and video serves over the LTE network. To make the voice over LTE more competitive, it is important to make the service matching the existing telecom grade of services. One of the issues is to shorten the call set up time. In one novel aspect of the current invention, early SDP negotiation is adopted to shorten the call set up time. In another novel aspect of the current invention, the UE-initiated early resource allocation is used to speed up the voice over LTE call set up. The embodiments of the present invention address the needs to shorten the call set up time for voice over LTE applications.

Figure 1:
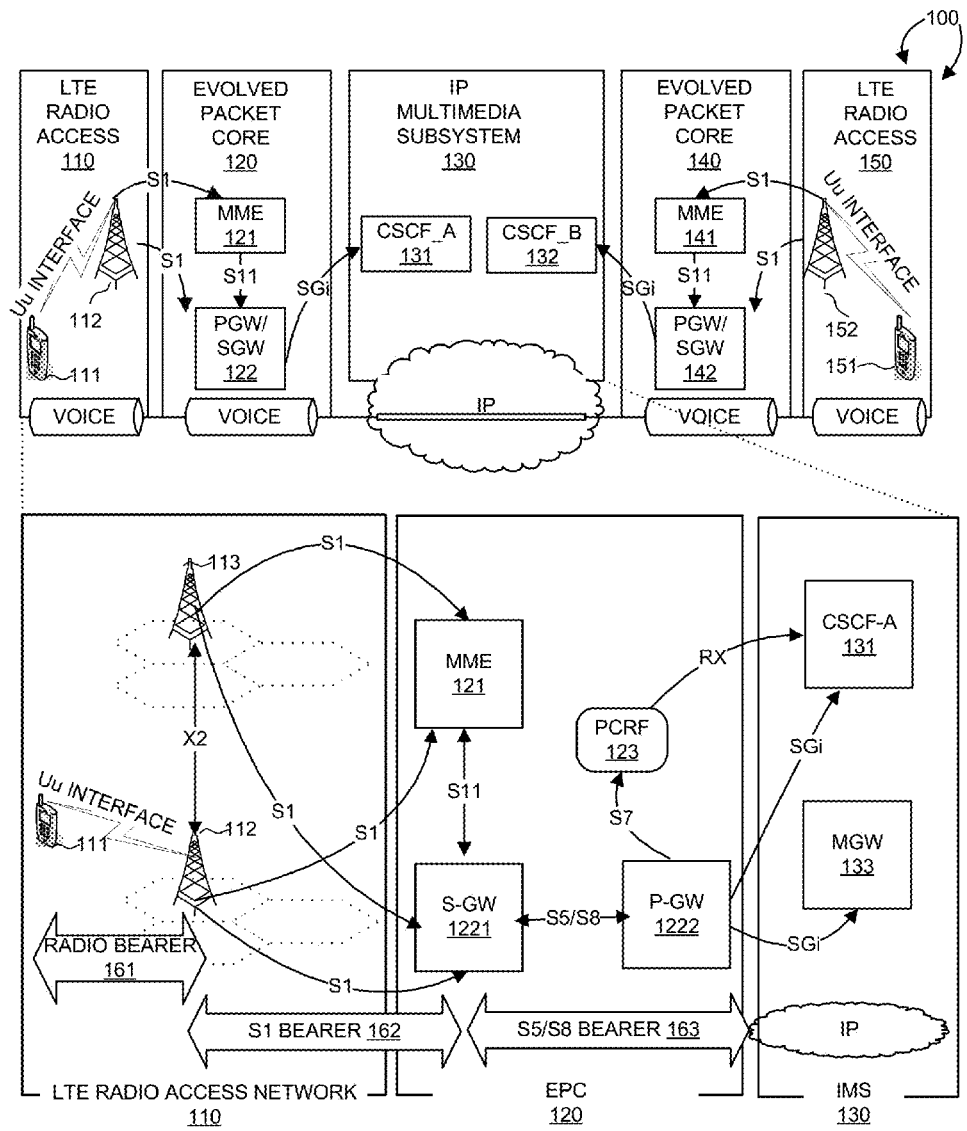
FIG. 1 schematically shows a diagram of a wireless communication system in accordance with embodiments of the invention.

FIG. 1 schematically shows a diagram of a wireless communication system 100 in accordance with embodiments of the invention. FIG. 1 shows an exemplary end-to-end mobile-to-mobile call using the voice over LTE architecture. Wireless communication system 100 includes an origination LTE radio-access-network (RAN) 110, an evolved packet core (EPC) network 120. On the termination side, Wireless communication system 100 includes a termination LTE radio-access-network (RAN) 150, an evolved packet core (EPC) network 140. Wireless communication system 100 also includes an IP multimedia subsystem (IMS) 130 that connects the origination and the termination networks. A UE 111 is connected with an eNB 112 in LTE RAN 110. UE 111 connects with eNB 112 via Uu interface for signaling. Upon connecting to RAN 110, UE 111 can establish data communication through eNB 112. When voice over LTE is implemented, a dedicated voice channel can be established between UE 111 and eNB 112 for voice and/or video calls. When UE 111 initiates a voice call, it includes its codec information in the initial signaling exchanges through the signaling channel. In one embodiment of the current invention, UE 111 starts early resource reservation upon initiating the voice call without waiting for the network to initiate the resource allocation.

LTE RAN 110 is connected with EPC 120 via S1 interface for signaling. EPC 120 includes Mobility Management Entity (MME) 121 and Serving Gateway (SGW)/packet data network (PDN) gateway (PGW) 122. MME 121 connects with SGW/PGW 122 through S11 interface. eNB 112 communicates with MME 121 for call set up signaling process. MME 121, connecting through interface S11, communicates with SGW/PGW 122 to set up signaling channel and dedicated voice channel. EPC 120 connects with IMS 130 via interface SGi for signaling. The voice packets are transmitted through the IP network of IMS 130. IMS 130 has the transport layer, the session and control layer, and the application and services layer. The voice over LTE uses the session and control layer for call set up. The session and control layer implements IMS call session control function (CSCF). IMS 130 includes a CSCF_A 131 and a CSCF_B 132. CSCF_A 131 connects with the origination side EPC through interface SGi. CSCF_B 132 connects with the call termination side through interface SGi. IMS 130 connects with EPC 140 on the call termination side through interface SGi for signaling. EPC 140 includes MME 141 and PGW/SGW 142. MME 141 connects with SGW/PGW 142 through S11 interface. EPC 140 connects with LTE RAN 150 for the call termination side vi interface 51 for signaling. A UE 151 is connected to the network via LTE RAN 150. LTE RAN 150 includes an eNB 152. UE 151 receives call set up signaling messages from eNB 152 via Uu Interface. Similar to the call origination side for UE 111, UE 151 receives call set up messages from Uu Interface. UE 151 needs to set up a dedicated resource channel for voice communication as well. One of the important steps is to set up the dedicated channel. In one embodiment of the current invention, UE 151 initiates a dedicated resource allocation process without waiting for commands from the network.

FIG. 1 also shows a more detailed diagram of LTE RAN 110, EPC 120 and IMS 130. As illustrated, on the call origination side, the system includes RAN 110, EPC 120 and IMS 130. RAN 110 provides radio access for UEs in the network. UE 111 connects to eNB 112 via radio interface. An eNB 113 is connected with eNB 112 via interface X2. One or more eNBs in RAN 110 provides radio link coverage for UEs in RAN 110. In a voice over LTE application, a radio bearer is set up between UE 111 and its serving eNB 112 to establish a dedicated voice channel. eNB 112 and eNB 113 connect via X2 interface. eNB 112 and eNB 113 connect with Mobility Management Entity (MME) 121 and Serving Gateway (S-GW) 1221 via S1 interfaces S11. S-GW 1221 further connects with P-GW 1222 via S5/S8 interface. P-GW 1222 connects Policy and Charging Rule Function (PCRF) 123 via S7 interface. PCRF 123 controls network QoS functions. P-GW 1222 connects with IMS 130 via SGi interface. In this detailed view of the origination side of the network, FIG. 1 further shows LTE bearer path. Both the UE and the network can initiate a bearer setup. An end-to-end bearer for a LTE channel includes a radio bearer 161 that connects UEs and eNBs, an S1 bearer 162 that connects eNBs to MME 121 or S-GW 1221, and an S5/S8 bearer 163 that connects S-GW 1221 to P-GW 1222. Similar system architectures apply to the termination side of the network. In accordance to embodiments of the current invention, early resource reservations are used to set up the dedicated bearers such that the call set up time can be shortened for Voice over LTE.

Figure 2:
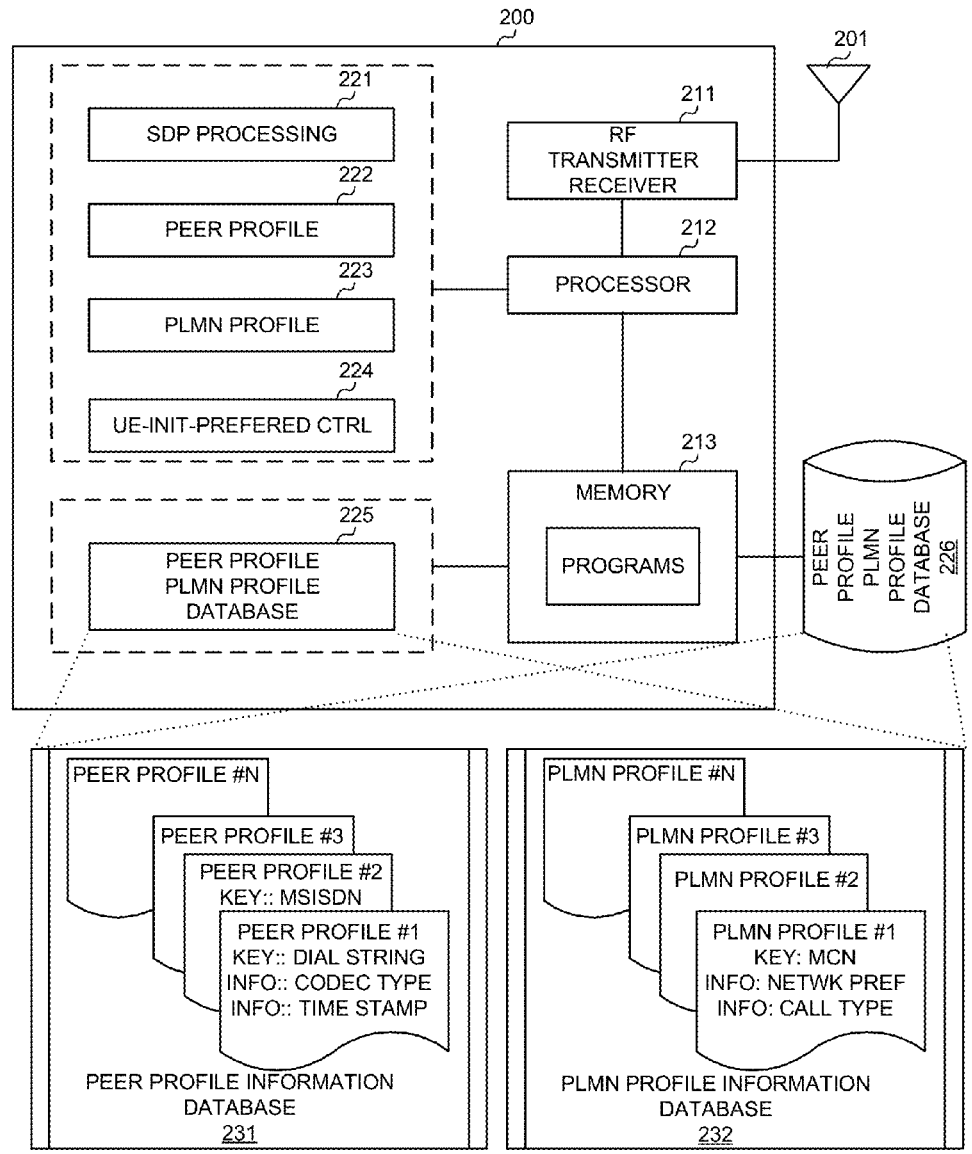
FIG. 2 shows a UE diagram that supports early-negotiation and early-reservation in accordance to embodiments of the current invention.

FIG. 2 shows a UE 200 diagram that supports early-negotiation and early-reservation in accordance to embodiments of the current invention. Antenna 201 transmits and receives RF signals. RF transceiver module 211, coupled with antenna 201, receives RF signals from antenna 201, converts them to baseband signals and sends them to processor 212. RF transceiver 211 also converts received baseband signals from the processor 212, converts them to RF signals, and sends out to antenna 201. The RF signals include signaling protocols. In some embodiments of the current invention, a session initiation protocol (SIP) is used. RF transceiver 211 transmits and receives SIP messages from remote devices. Processor 212 processes the received baseband signals and invokes different functional modules to perform features in UE 200. Memory 213 stores program instructions and data to control the operations of UE 200.

FIG. 2 also shows five modules 221, 222, 223, 224 and 225, which carry out embodiments of the present invention. A SDP processing 221 processes SDP messages. SDP processing 221 receives SDP offer message from a remote calling party in a mobile-termination case. SDP processing 221 obtains codec information from SDP offering message. A peer profile 222 updates peer profile into a database of UE 200 and retrieves peer profile information from the database. In accordance with embodiments of the current invention, peer profile 222 provides information for SDP processing 221 to do early negotiation for codec. Peer profile 222 also provides information for early reservation in accordance with embodiments of the current invention. A PLMN profile 223 updates PLMN profile for a database and retrieves PLMN profile information from the database. In accordance with embodiments of the current invention, PLMN profile 223 provides information for early reservation in accordance with embodiments of the current invention. A UE-Init-Preferred control unit 224 controls the procedure to initiate a UE-initiated early resource allocation. Memory 213 contains a peer profile database and PLMN profile database 225. Peer profile/PLMN profile database can also be external to UE 200 processor. For example, peer profile/PLMN profile database 226 can be stored in a local disk of UE 200. Database 226 can also be external to UE 200 and stored in an external storage. Database 226 is retrievable by UE 200.

FIG. 2 also shows an exemplary detailed view of a peer-profile-information database 231 and a PLMN-profile-information database 232 in accordance with embodiments of the current invention. Peer-profile-information database 231 includes one or more peer profile entries, such as peer profile #1, peer profile #2, peer profile #3, and peer profile #N. Each peer profile contains information about other UEs or devices in the wireless network system that may communicate with UE 200. In accordance with embodiments of the current invention, the peer profile information may include the dial string of the remote device, the codec type of the remote device, and the time stamp of last update of the record. The elements of each entry of the peer profile can be preconfigured or can be dynamically updated. In one embodiment, the peer profile entries have one element as the key. For example, the dial string or the mobile station ISDN (MSISDN) string can be used as the key to the entries in the database for fast access. In other embodiments, other elements can be used as key. Peer profile information database 231 can be stored internally such as in peer profile/PLMN profile database 225, or externally such as in peer profile/PLMN profile database 226.

Similarly, PLMN-profile-information database 232 includes one or more PLMN profile entries, such as PLMN profile #1, PLMN profile #2, PLMN profile #3, and PLMN profile #N. Each PLMN profile contains information about other connecting PLMN the wireless network system that may communicate with UE 200. In accordance with embodiments of the current invention, the PLMN profile information may include the identifier of a connecting PLMN (e.g., Mobile Country Code (MCC)+Mobile Network Code (MNC)), the network preference of the PLMN, and the call types supported in the PLMN. The elements of each entry of the peer profile can be preconfigured or can be dynamically updated. The network preferences may include multiple categories. One of the network preferences is the PLMN preference on resource reservation. The resource-reservation preferences may include accepting early resource reservation, accepting UE-initiated resource reservation after SDP negotiation, and not accepting UE-initiated resource reservation. If UE-initiated resource reservation is accepted, the network preferences entry may also include a timer for UE-initiated resource reservation. When the UE-initiated resource reservation timer expires, the UE can initiate the resource reservation without waiting for the network command. In one embodiment of the current invention, this timer can be set to zero such that the call set up time can be further reduced. In another embodiment of the current invention, the timer can be set to be zero if it is an emergency call. The call type in the PLMN profile entries may indicate the type of calls the PLMN supports, such as voice call, video call and emergency call. Other elements in the PLMN profile entries may include UE may use the proxy CSCF (P-CSCF) in home network or in visited network. The elements may also include access network type, such as Wifi, LTE, or High Speed Packet Access (HSPA). In one embodiment, the PLMN profile entries have one element as the key. For example, the Mobile Country Code (MCC)+Mobile Network Code (MNC) can be used as the key to the entries in the database for fast access. In other embodiments, other elements can be used as key. PLMN profile information database 232 can be stored internally such as in peer profile/PLMN profile database 225, or externally such as in peer profile/PLMN profile database 226.

Similar configuration exists in an eNB where one or more antennae transmits and receives RF signals. RF transceiver module, coupled with the antennae, receives RF signals from the antenna, converts them to baseband signals and sends them to a processor. The RF transceiver also converts received baseband signals from the processor, converts them to RF signals, and sends out to the antennae. The processor processes the received baseband signals and invokes different functional modules to perform features in the eNB. A memory stores program instructions and data to control the operations of the eNB. The eNB also includes several functional modules to carry out some embodiments of the invention.

In a voice over LTE call flow using SIP, the mobile origination (MO) UE sends a first INVITE message with SDP including codec information. In a basic call set up call flow, the mobile termination (MT) UE upon receiving the first INVITE from the MO UE starts local ringing and sends a 180 (Ringing) message back to the MO UE. Upon user answers on the MT UE, the MT UE sends provisional response back to the MO UE. Additional SDP negotiation follows the initial SDP negotiation. Upon successful SDP negotiation, the network will initiate dedicated bearer allocation for the MO and MT UEs. The call set up time spans from the time the user answers till the end-to-end dedicated bearer established. Since the SDP negotiation and dedicated resource allocation both may take long time, the user may experience voice gap upon answering the call before the end-to-end dedicated channel can be established.

In another call set up model, called precondition call setup, for voice over LTE, the MO UE sends the first INVITE to the MT UE. The MT UE, upon receiving the first INVITE does not set ringer locally immediately. Instead, a 183 message is sent back with SDP answers. Upon successful SDP negotiation, the network initiates dedicated bearer allocation for MO and MT UEs. The MO UE sends Update message to MT UE upon establishing dedicated bearer on MO side. The MT UE starts to set local ringer. The precondition call set up reduces the voice gap upon user answering because the dedicated bearer is set up before the local ringing. However, the precondition call set up model may have a long gap for the remote MT UE to ring after the MO UE initiated the call. Improvements are presented to shorten the call set up in both the basic call set up model and the precondition call set up model.

Figure 3:
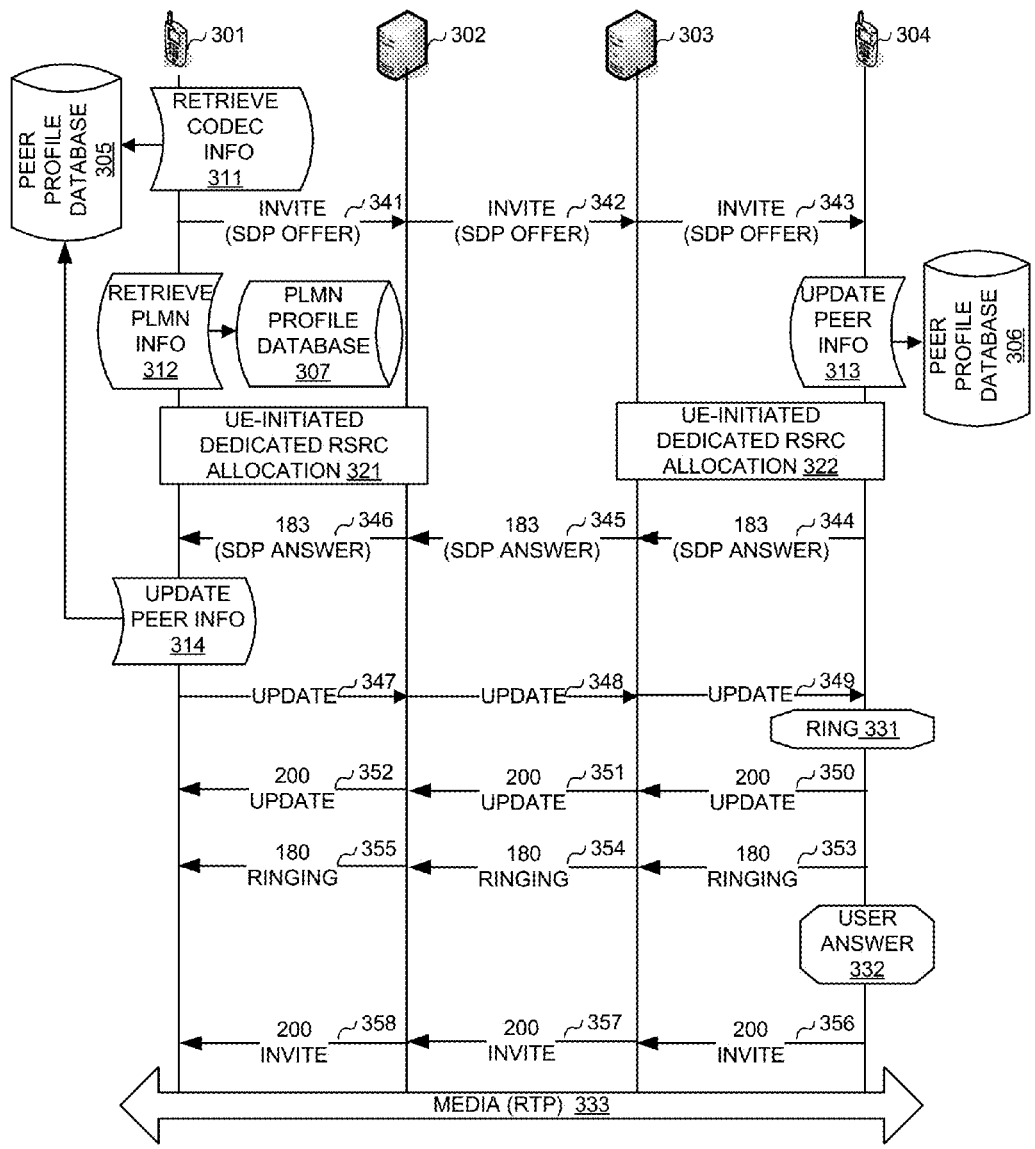
FIG. 3 shows an exemplary call flow diagram for early reservation with precondition call set up model in accordance with embodiments of the current invention.

FIG. 3 shows an exemplary call flow diagram for early reservation with precondition call set up model in accordance with embodiments of the current invention. A UE 301 is connected a CSCF_A 302. CSCF_A 302 is connected with a CSCF_B 303, which is connected with a UE 304. UE 301 has a peer profile database 305 and a PLMN database 307. UE 304 has a peer profile database 306. UE 301 initiated a voice or video call to UE 304. At step 311, UE 301 retrieves codec information from its peer profile database 305. In one embodiment, UE 301 retrieves the codec information of UE 304 using dial string of UE 304. UE 301 upon finding the entry for UE 304 can obtain the codec information of UE 304. Based on the retrieved codec information of UE 304, UE 301 can choose a matching codec for the intended call. At step 341, UE 301 sends an INVITE with SDP offer that includes matching codec information based on the retrieved codec information of UE 304. At step 342, CSCF_A 302 upon receiving the INVITE forwards the INVITE to CSCF_B 303, which forwards the INVITE to UE 304 at step 343. In one embodiment of the current invention, at step 313, upon receiving INVITE with SDP offer, UE 304 updates its peer profile database 306 with information retrieved from the SDP offer. The information may include the codec information for UE 301. In one embodiment of the current invention, UE 301, the MO UE, initiates early resource reservation to shorten the call set up time. At step 312, UE 301 retrieves PLMN information from its PLMN profile database 307. If the retrieved PLMN information indicates UE-initiated resource reservation is accepted, UE 301, at step 321 starts UE-initiated dedicated resource allocation process without waiting for messages from UE 304 or the network. Similarly, on the MT side, UE 304 upon receiving the first INVITE from UE 301 would start its UE-initiated dedicated resource allocation procedure at step 322. At step 344, UE 304 sends back a 183 (In Progress) message, which include SDP answer with codec information of UE 304. Upon receiving the 183 message, at step 345, CSCF_B 303 forwards the message to CSCF_A 302, which forwards the 183 message to UE 301 at step 346. In other embodiments of the current invention, any other 1xx provisional responses can be sent instead of the 183 message. The rest of the message flow remains the same. In one embodiment of the current invention, at step 314, UE 301 updates its peer profile database 305 with the received SDP information of UE 304. At step 347, UE 301 sends UPDATE message. At step 348, CSCF_A 302, upon receiving the UPDATE message, forwards it to CSCF_B 303, which forwards the UPDATE message to UE 304 at step 349. Upon receiving the UPDATE message, UE 304, at step 331 rings. UE 304 sends back UPDATE message at step 350. CSCF_B 303, at step 351, upon receiving the UPDATE message, forwards it to CSCF_A 302, which forwards the UDPATE message to UE 301 at step 352. At step 353, UE 304 sends back 180 (RINGING) message. CSCF_B 303, at step 354, upon receiving the 180 (RINGING) message, forwards it to CSCF_A 302, which forwards the 180 (RINGING) message to UE 301 at step 355. At step 332, user answers the call to UE 304. Subsequently, UE 304 at step 356 sends 200 INVITE back. CSCF_B 303, at step 357, upon receiving the 200 INVITE message, forwards it to CSCF_A 302, which forwards the 200 INVITE message to UE 301 at step 358. At step 333, the end-to-end media path is set up and UE 301 and UE 304 can start voice/video communication.

Figure 4:
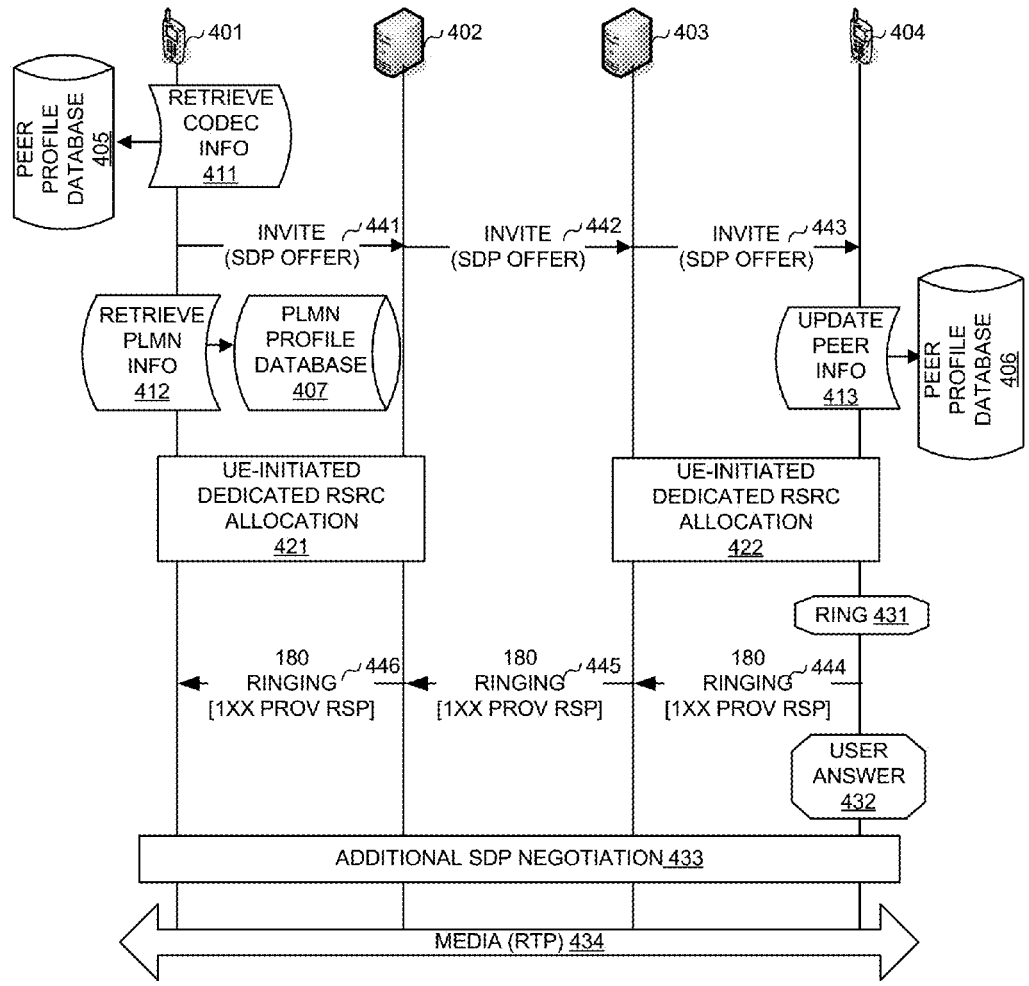
FIG. 4 shows an exemplary call flow diagram for early reservation with basic call set up model in accordance with embodiments of the current invention.

FIG. 4 shows an exemplary call flow diagram for early reservation with basic call set up model in accordance with embodiments of the current invention. A UE 401 is connected a CSCF_A 402. CSCF_A 402 is connected with a CSCF_B 403, which is connected with a UE 404. UE 401 has a peer profile database 405 and a PLMN database 407. UE 404 has a peer profile database 406. UE 401 initiated a voice or video call to UE 404. At step 411, UE 401 retrieves codec information from its peer profile database 405. In one embodiment, UE 401 retrieves the codec information of UE 404 using dial string of UE 404. UE 401 upon finding the entry for UE 404 can obtain the codec information of UE 404. Based on the retrieved codec information of UE 404, UE 401 can choose a matching codec for the intended call. At step 441, UE 401 sends an INVITE with SDP offer that includes matching codec information based on the retrieved codec information of UE 404. At step 442, CSCF_A 402 upon receiving the INVITE forwards the INVITE to CSCF_B 403, which forwards the INVITE to UE 404 at step 443. In one embodiment of the current invention, at step 413, upon receiving INVITE with SDP offer, UE 404 updates its peer profile database 406 with information retrieved from the SDP offer. The information may include the codec information for UE 401. In one embodiment of the current invention, UE 401, the MO UE, initiates early resource reservation to shorten the call set up time. At step 412, UE 401 retrieves PLMN information from its PLMN profile database 407. If the retrieved PLMN information indicates UE-initiated resource reservation is accepted, UE 401, at step 421 starts UE-initiated dedicated resource allocation process without waiting for messages from UE 404 or the network. Similarly, on the MT side, UE 404 upon receiving the first INVITE from UE 401 would start its UE-initiated dedicated resource allocation procedure at step 422. At step 431, UE 404 starts local ringing. At step 444, UE 404 sends 180 (RINGING) message back. CSCF_B 403, at step 445, upon receiving the 180 (RINGING) message, forwards it to CSCF_A 402, which forwards the 180 (RINGING) message to UE 401 at step 446. At step 432, user answers the call to UE 404. Additional SDP negotiation may be needed. If so, UE 401 and UE 404 exchange additional SDP negotiation at step 433. At step 434, the end to end media path between UE 401 and UE 404 is established.

Figure 5:
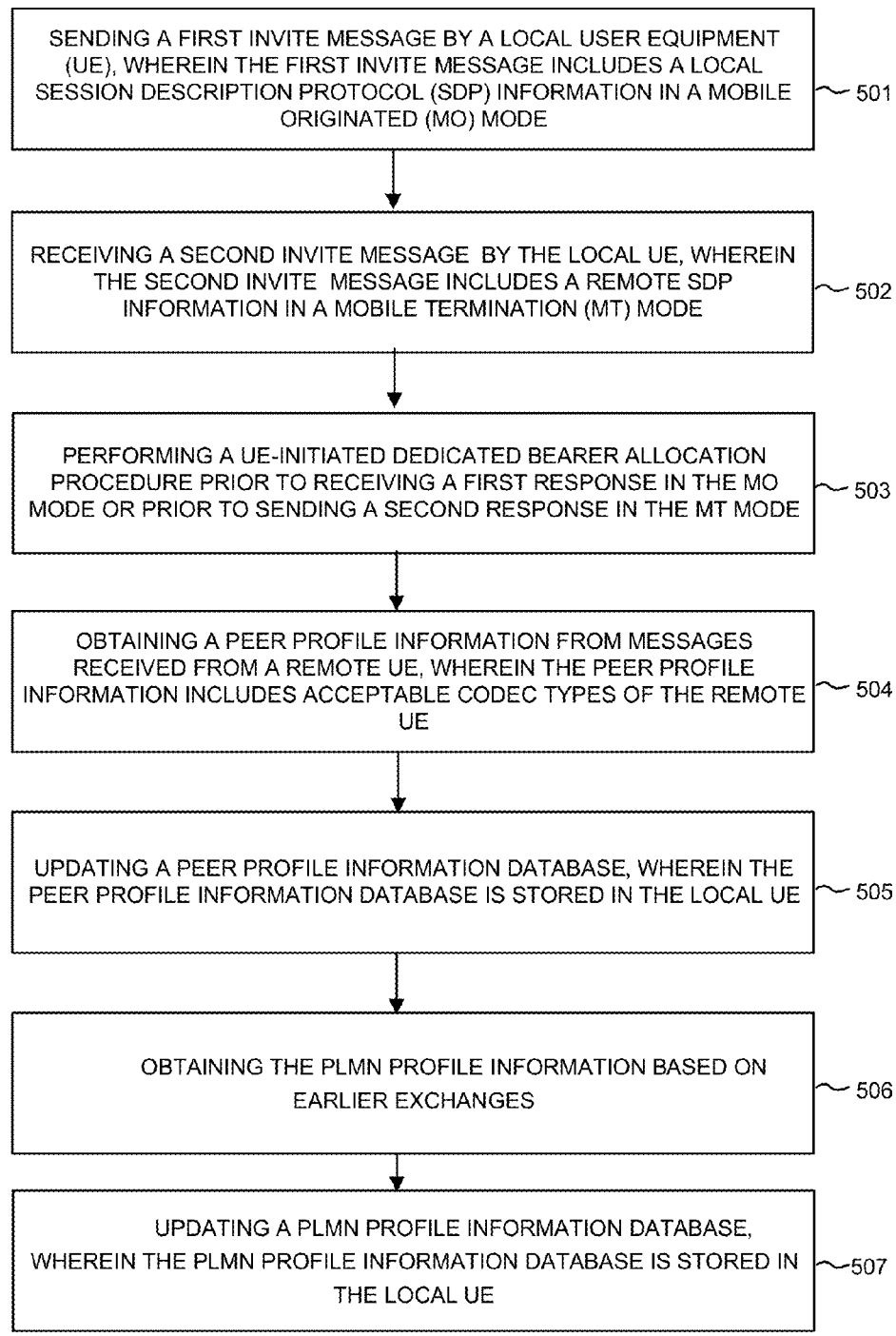
FIG. 5 shows a message flow diagram for early resource reservation in accordance with embodiments of the current invention.

FIG. 5 shows a message flow diagram for early resource reservation in accordance with embodiments of the current invention. At step 501, a local UE sends a first INVITE message, wherein the first INVITE message includes a local session description protocol (SDP) information in a mobile originated (MO) mode. At step 502, the local UE receives a second INVITE message, wherein the second INVITE message includes a remote SDP information in a mobile termination (MT) mode. At step 503, the local UE performs a UE-initiated dedicated bearer allocation procedure prior to receiving a first response in the MO mode or prior to sending a second response in the MT mode. At step 504, the local UE obtains a peer profile information from messages received from a remote UE, wherein the peer profile information includes acceptable codec types of the remote UE. At step 505, the local UE updates a peer-profile information database, wherein the peer-profile information database is stored in the local UE. At step 506, the local UE obtains the PLMN profile information based on prior exchanges. Such prior exchanges may include prior experience of the interaction with the PLMN entity, configuration procedures/messages, or experimental interaction with the PLMN entity. In one embodiment, the PLMN profile information may be obtained according to the previous result of the UE initiated early resource reservation. In this case, the initial value of the PLMN information should be set as "UE-initiated resource reservation is accepted". At step 507, the local UE updates a PLMN profile information database, wherein the PLMN profile information database is stored in the local UE.

Figure 6:
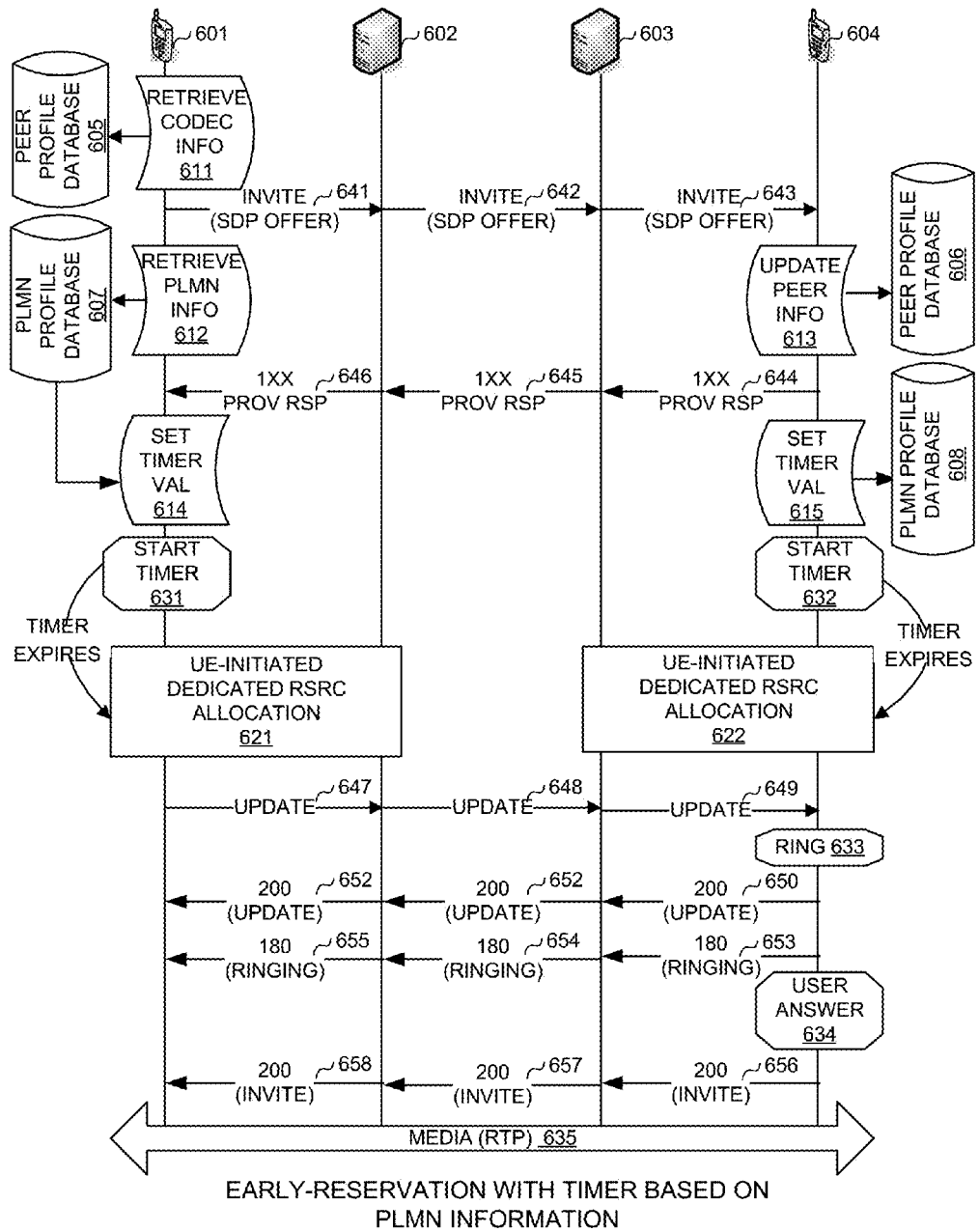
FIG. 6 shows an exemplary call flow diagram for early reservation with timer based on PLMN information in accordance with embodiments of the current invention.

FIG. 6 shows an exemplary call flow diagram for early reservation with timer based on PLMN information in accordance with embodiments of the current invention. A UE 601 is connected a CSCF_A 602. CSCF_A 602 is connected with a CSCF_B 603, which is connected with a UE 604. UE 601 has a peer profile database 605 and a PLMN database 607. UE 604 has a peer profile database 606. UE 601 initiated a voice or video call to UE 604. At step 611, UE 601 retrieves codec information from its peer profile database 605. In one embodiment, UE 601 retrieves the codec information of UE 604 using dial string of UE 604. UE 601 upon finding the entry for UE 604 can obtain the codec information of UE 604. Based on the retrieved codec information of UE 604, UE 601 can choose a matching codec for the intended call. At step 641, UE 601 sends an INVITE with SDP offer that includes matching codec information based on the retrieved codec information of UE 604. At step 642, CSCF_A 602 upon receiving the INVITE forwards the INVITE to CSCF_B 603, which forwards the INVITE to UE 604 at step 643. In one embodiment of the current invention, at step 613, upon receiving INVITE with SDP offer, UE 604 updates its peer profile database 606 with information retrieved from the SDP offer. The information may include the codec information for UE 601. In one embodiment of the current invention, UE 601, the MO UE, initiates early resource reservation to shorten the call set up time. At step 612, UE 601 retrieves PLMN information from its PLMN profile database 607. If the retrieved PLMN information indicates UE-initiated resource reservation is accepted, UE 601, at step 621 starts UE-initiated dedicated resource allocation process without waiting for messages from UE 304 or the network. Similarly, on the MT side, UE 604 upon receiving the first INVITE from UE 601, would start its UE-initiated dedicated resource allocation procedure at step 622. At step 644, UE 304 sends back a 183 (In Progress) message, which may include SDP answer with codec information of UE 604. Upon receiving the 183 message, at step 645, CSCF_B 603 forwards the message to CSCF_A 602, which forwards the 183 message to UE 601 at step 646. In other embodiments of the current invention, any other 1xx provisional responses can be sent instead of the 183 message. The rest of the message flow remains the same.

One way to shorten the call set up time is to start UE-initiated dedicated resource allocation without waiting for the command from the network. In the existing system, the UE should starts a timer once it initiates the call-set-up procedure on the MO side, or starts a timer once it receives a call-set-up request on the MT side. Once the timer expires, the UE should start UE-initiated dedicated resource allocation. Therefore, the UE can take advantage of the feature by shortening the timer value such that the UE can start the UE-initiated dedicated resource allocation earlier. In one embodiment of the current invention, the UE can set the timer value to be zero such that the UE-initiated dedicated resource allocation starts right after the initial call-set-up in the MO mode, or right after the receiving of call-set-up message in the MT mode. However, not all network nodes support this timer-based procedure feature. In one embodiment of the current invention UE 601 retrieves timer information from its PLMN profile database 607. At step 614, UE 601 set the timer value. In one embodiment of the current invention, the timer value may be directly retrieved from the PLMN profile database 607. In another embodiment of the current invention, the timer value may be set at step 614 based on the network preference information or early reservation preferences retrieved from the PLMN profile database 607. The network preference or early reservation preferences may include, accept early resource reservation, accept UE-initiated resource reservation after SDP negotiation, and do not accept UE-initiated resource reservation. The timer value may be shortened if the preference indicates accept UE-initiated resource reservation after SDP negotiation or accept early resource reservation. In one embodiment of the current invention, the timer value may be shortened to be zero. At step 631, UE 601 starts the timer. Similarly, UE 604, at step 615, may set the timer value based on the information retrieved from its PLMN profile database 608. At step 632, UE 604 starts the timer. When the timer expires, UE 601 starts UE-initiated dedicated resource allocation at step 621. Similarly, when the timer expires at UE 604, UE 604 starts UE-initiated dedicated resource allocation at step 622. At step 647, UE 601 sends UPDATE message upon finishing the resource allocation. At step 648, CSCF_A 602 upon receiving the UPDATE forwards the UPDATE to CSCF_B 603, which forwards the UPDATE to UE 604 at step 649. At step 633, UE 604 starts local ring. At step 650, UE 604 relies with 200 (UPDATE). Upon receiving the 200 (UPDATE) message, at step 651, CSCF_B 603 forwards the message to CSCF_A 602, which forwards the 200 (UPDATE) to UE 601 at step 646. At step 656, UE 604 relies with 200 (INVITE). Upon receiving the 200 (INVITE) message, at step 657, CSCF_B 603 forwards the message to CSCF_A 602, which forwards the 200 (INVITE) to UE 601 at step 648. At step 635, the end-to-end media resource is set up between UE 601 and UE 604.

Figure 7:
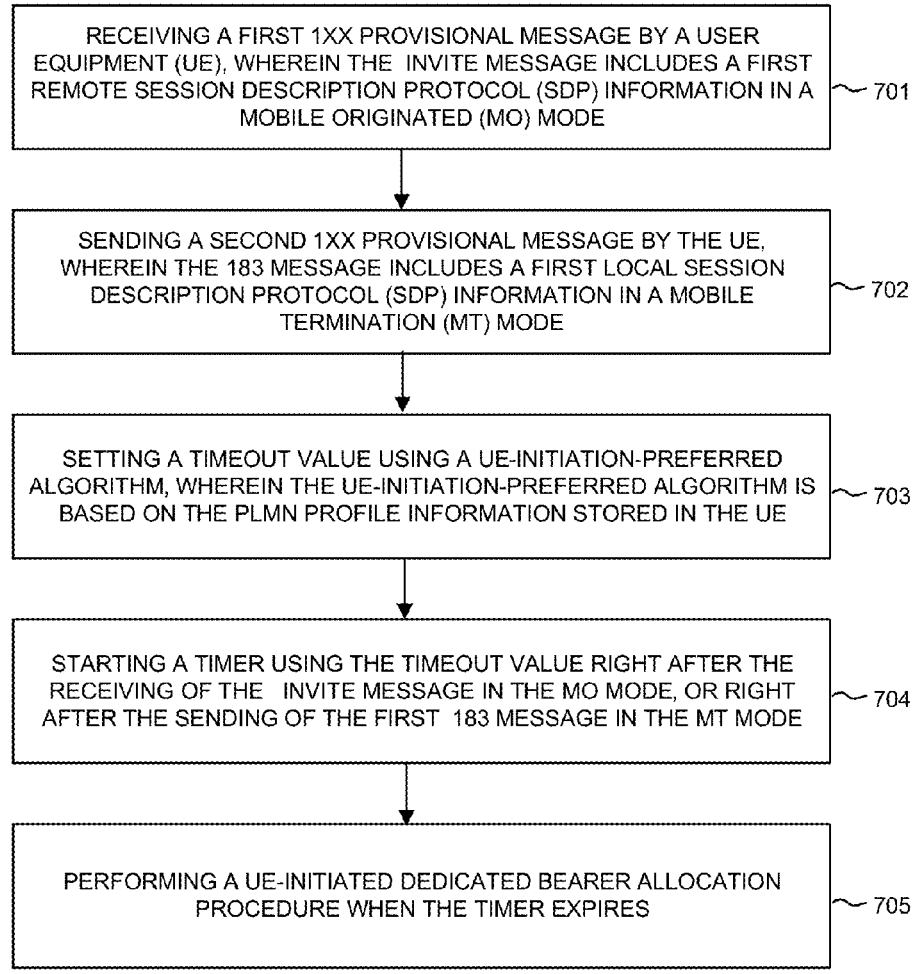
FIG. 7 shows message flow diagram for early reservation with timer based on PLMN information in accordance with embodiments of the current invention.

FIG. 7 shows message flow diagram for early reservation with timer based on PLMN information in accordance with embodiments of the current invention. At step 701, the UE receives a first 1xx Provisional message, wherein the 1xx Provisional message includes a first remote session description protocol (SDP) information in a mobile originated (MO) mode. At step 702, the UE sends a second 1xx Provisional message, wherein the 183 message includes a first local session description protocol (SDP) information in a mobile termination (MT) mode. At step 703, the UE sets a timeout value using a UE-initiation-preferred algorithm, wherein the UE-initiation-preferred algorithm is based on the PLMN profile information stored in the UE. At step 704, the UE starts a timer using the timeout value right after the receiving of the first 1xx Provisional message in the MO mode, or right after the sending of the second 1xx Provisional message in the MT mode. At step 705, the UE performs a UE-initiated dedicated bearer allocation procedure when the timer expires.

Figure 8:
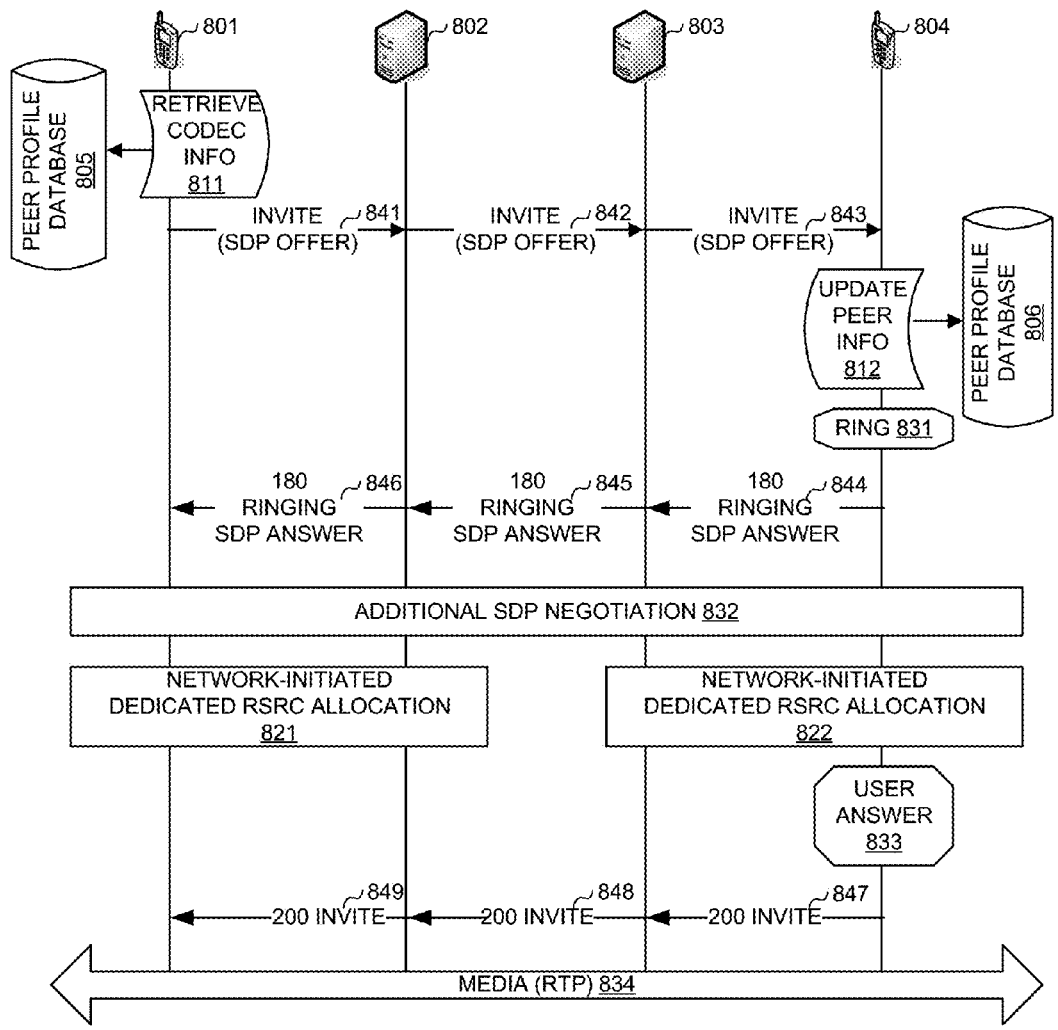
FIG. 8 shows an exemplary call flow diagram for early negotiation in accordance with embodiments of the current invention.

FIG. 8 shows an exemplary call flow diagram for early negotiation in accordance with embodiments of the current invention. A UE 801 is connected a CSCF_A 802. CSCF_A 802 is connected with a CSCF_B 803, which is connected with a UE 804. UE 801 has a peer profile database 805 and a PLMN database 807. UE 804 has a peer profile database 806. UE 801 initiated a voice or video call to UE 804. At step 811, UE 801 retrieves codec information from its peer profile database 805. In one embodiment, UE 801 retrieves the codec information of UE 804 using dial string of UE 804. UE 801 upon finding the entry for UE 804 can obtain the codec information of UE 804. Based on the retrieved codec information of UE 804, UE 801 can choose a matching codec for the intended call. At step 841, UE 801 sends an INVITE with SDP offer that includes matching codec information based on the retrieved codec information of UE 804. At step 842, CSCF_A 802 upon receiving the INVITE forwards the INVITE to CSCF_B 803, which forwards the INVITE to UE 804 at step 843. In one embodiment of the current invention, at step 812, upon receiving INVITE with SDP offer, UE 804 updates its peer profile database 806 with information retrieved from the SDP offer. The information may include the codec information for UE 801. At step 831, UE 804 starts local ringing. At step 844, UE 804 sends 180 (RINGING) message back. In one embodiment of the current invention, the 180 (RINGING) message includes a SDP answer with codec information of UE 804. CSCF_B 803, at step 845, upon receiving the 180 (RINGING) message forwards it to CSCF_A 802, which forwards the 180 (RINGING) message to UE 801 at step 846. Therefore, UE 801 and UE 804 exchanges SDP information at an earlier stage because UE 804 replies in the 180 (RINGING) the SDP answer. This also shortens the SDP negotiation time. At step 832, UE 801 and UE 804 may exchange additional SDP negotiation. Because UE 801 starts its initial SDP offer in the INVITE with some known information retrieved from its peer profile database, the possibility of the SDP offer failure is much lower. Further, UE 804 piggy-bagged its SDP information in the early message exchange such as 180 (RINGING). The early negotiation of codec information would shorten the call set up time. At step 821, UE 801 starts network-initiated dedicated resource set up. Similarly, at step 822, UE 804 starts network-initiated dedicated resource set up. At step 833, UE 804 answers. At step 847, UE 804 sends back 200 (INVITE). CSCF_B 803, at step 848, upon receiving the 180 (RINGING) message forwards it to CSCF_A 802, which forwards the 200 (INVITE) message to UE 801 at step 849. At step 834, the end-to-end media path for UE 801 and UE 804 is set up.

Figure 9:
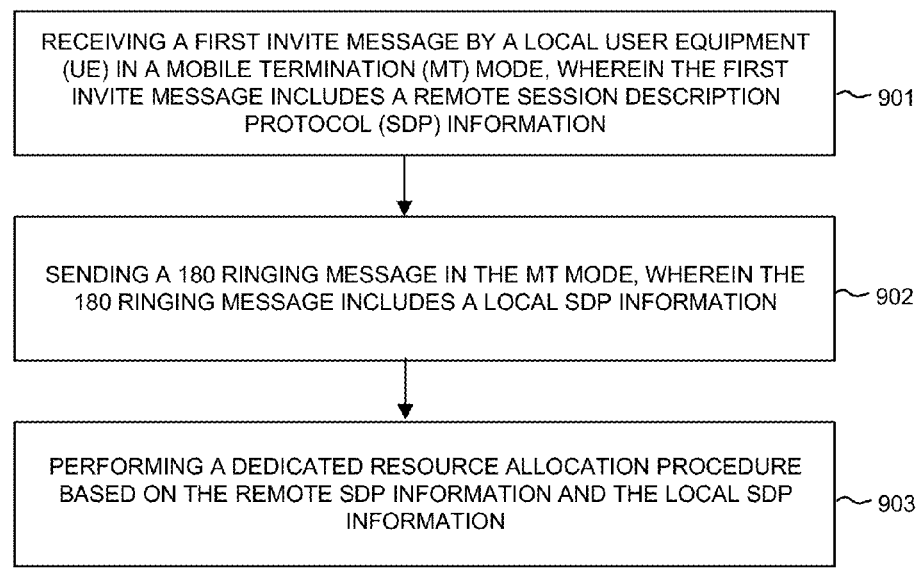
FIG. 9 shows message flow diagram for early negotiation in accordance with embodiments of the current invention.

FIG. 9 shows message flow diagram for early negotiation in accordance with embodiments of the current invention. At step 901, the UE receives a first INVITE message in a mobile termination (MT) mode, wherein the first INVITE message includes a remote session description protocol (SDP) information. At step 902, the UE sends a 180 Ringing message in the MT mode, wherein the 180 Ringing message includes a local SDP information. At step 903, the UE performs a dedicated resource allocation procedure based on the remote SDP information and the local SDP information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
sending a first INVITE message by a local user equipment (UE) if in a mobile originated (MO) mode, wherein the first INVITE message includes local session description protocol (SDP) information;
receiving a second INVITE message by the local UE, wherein the second INVITE message includes remote SDP information if in a mobile termination (MT) mode; and
performing a UE-initiated dedicated resource allocation procedure based on stored PLMN profile information prior to receiving a first response in the MO mode or prior to sending a second response in the MT mode.

2. The method of claim 1, wherein the first response is a first 1xx provisional response message, and wherein the second response is a second 1xx response message.

3. The method of claim 1, further comprising:
obtaining peer profile information from messages received from a remote UE, wherein the peer profile information includes acceptable codec types of the remote UE; and
updating a peer profile information database, wherein the peer profile information database is stored in the local UE.

4. The method of claim 1, wherein the UE-initiated dedicated resource allocation procedure is based on peer profile information, and wherein the local UE selects a compatible codec type based on a remote codec type in the peer profile information.

5. The method of claim 1, wherein the PLMN profile information includes a PLMN entity's resource allocation preference.

6. The method of claim 5, wherein the PLMN entity's resource allocation preference comprises at least one of: accepting early resource reservation, accepting UE-initiated resource reservation after SDP negotiation, and not accepting UE-initiated resource reservation.

7. The method of claim 5, further comprising:
obtaining the PLMN profile information; and
updating a PLMN profile information database, wherein the PLMN profile information database is stored in the local UE.

8. A method comprising:
receiving a first 1xx provisional response message by a user equipment (UE), wherein the first 1xx provisional response message includes remote session description protocol (SDP) information if in a mobile originated (MO) mode;
sending a second 1xx provisional response message by the UE, wherein the second 1xx provisional response message includes local SDP information if in a mobile termination (MT) mode; and
setting a timeout value using a UE-initiation-preferred algorithm, wherein the UE-initiation-preferred algorithm is based on PLMN profile information stored in the UE;
starting a timer using the timeout value right after the receiving of the first 1xx provisional response message in the MO mode, or right after the sending of the second 1xx provisional response message in the MT mode; and
performing a UE-initiated dedicated bearer allocation procedure when the timer expires.

9. The method of claim 8, wherein the UE-initiation-preferred algorithm adjusts the timeout value based on an operator preference entry in the PLMN profile information.

10. The method of claim 9, wherein the operator preference entry is accepting early resource reservation or accepting UE-initiated resource reservation after SDP negotiation, and wherein the timeout value is set to be zero.

11. The method of claim 8, wherein the UE-initiation-preferred algorithm adjusts the timeout value based on a call type entry in the PLMN profile information.

12. The method of claim 11, wherein the call type entry indicates an emergency call, and wherein the timeout value is set to be zero.

13. A method comprising:
receiving a first INVITE message by a local user equipment (UE) in a mobile termination (MT) mode, wherein the first INVITE message includes remote session description protocol (SDP) information;
sending a 180 Ringing message in the MT mode, wherein the 180 Ringing message includes local SDP information; and
performing an UE-initiated dedicated resource allocation procedure based on the remote SDP information and the local SDP information prior to sending a first response message to the first INVITE message in the MT mode.

14. The method of claim 13 further comprising:
obtaining peer profile information from the first INVITE message, wherein the peer information includes codec information; and
updating a peer profile information database, wherein the peer profile information database is stored in the local UE.

15. The method of claim 13, further comprising:
retrieving a codec information from a peer profile information database in a mobile originated (MO) mode, wherein the codec information is one or more acceptable codec types of a remote UE; and sending a second INVITE message to the remote UE in the MO mode, wherein a compatible codec is selected based on the retrieved codec information.

16. An apparatus comprising:
a transmitter that transmits session initiation protocol (SIP) messages;
a receiver that receives SIP messages; and
a session description protocol (SDP) processing controller performing an early-negotiation procedure or an early-reservation procedure to set up a dedicated resource, wherein the early-negotiation procedure negotiates a codec type for the dedicated resource based on stored peer profile information before an answer by a user, and wherein the early-reservation procedure triggers and performs an user equipment (UE)-initiated dedicated bearer allocation procedure based on stored PLMN profile information prior to a network-initiated dedicated bearer allocation procedure.

17. The apparatus of claim 16, wherein during the early-negotiation procedure the SDP processing controller obtains remote SDP information from an INVITE message received by the receiver, and prepares a 180 Ringing message that includes local SDP information.

18. The apparatus of claim 16, further comprising:
a peer profile database that stores the peer profile information; and
a peer profile processing module that obtains peer profile information from received messages and updates the peer profile database with the peer profile information.

19. The apparatus of claim 18, wherein during the early-negotiation procedure the SDP processing controller retrieves codec information from the peer profile information database, wherein the codec information is one or more acceptable codec types of a remote UE, and selects a compatible codec type based on the retrieved codec information, wherein the selected compatible codec type is included in a INVITE message sent to the remote UE.

20. The apparatus of claim 16, wherein during the early-reservation procedure the SDP processing controller triggers the UE-initiated dedicated bearer allocation procedure prior to receiving a response to a first INVITE message or prior to sending a response to a received second INVITE message.

21. The apparatus of claim 16, further comprising:
a PLMN profile database that stores the PLMN profile information; and
a PLMN profile processing module that obtains the PLMN profile information based on earlier exchanges and updates the PLMN profile database with the PLMN profile information.

22. The apparatus of claim 21, wherein during the early-reservation procedure the SDP processing controller sets a timeout value based on the retrieved PLMN profile information, starts a timer with the timeout value upon sending or receiving a 1xx provisional response message and performs the UE-initiated dedicated bearer allocation procedure when the timer expires.

23. The apparatus of claim 22, wherein the retrieved PLMN profile information indicates accepting early resource reservation, and wherein the timeout value is set to be zero.

* * * * *